Oct. 1, 1963 K. A. BELL ETAL 3,105,898
TWO-STEP SERIAL ADDER
Filed Dec. 30, 1960 3 Sheets-Sheet 1
FIG.1
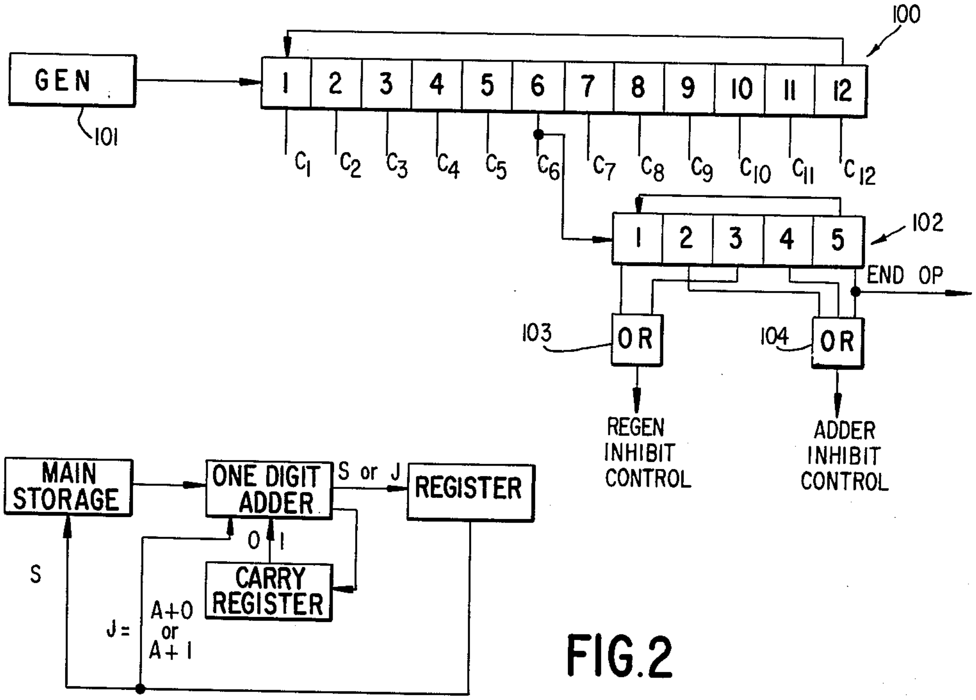
FIG.1, FIG.2
FIG.5
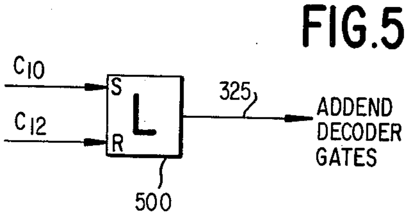
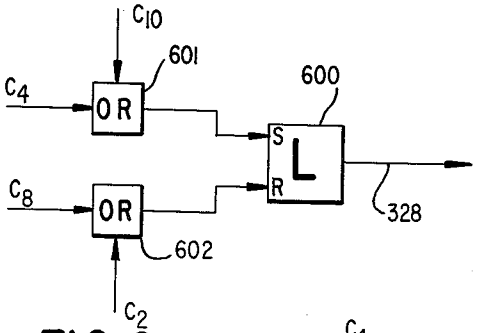
FIG.6
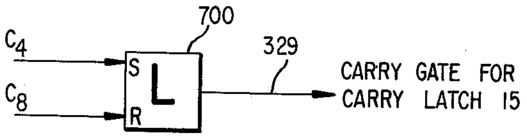
FIG.7
*INVENTORS*
KENNETH A. BELL
JOSEPH S. CONZOLA
*BY* Sughrue, Rothwell, Mion & Zinn
*ATTORNEYS*

TWO-STEP SERIAL ADDER

Filed Dec. 30, 1960 3 Sheets-Sheet 2

Oct. 1, 1963 K. A. BELL ET AL 3,105,898

TWO-STEP SERIAL ADDER

Filed Dec. 30, 1960 3 Sheets-Sheet 3

United States Patent Office 3,105,898
Patented Oct. 1, 1963

3,105,898
TWO-STEP SERIAL ADDER

Kenneth A. Bell, Vestal, and Joseph S. Conzola, Endwell, N.Y., assignors to International Business Machines Corporation, New York, N.Y., a corporation of New York Filed Dec. 30, 1960, Ser. No. 79,865
4 Claims. (Cl. 235—176)

This invention relates to an adder and more particularly to a single digit serial adder in which alternately the addend and augend values of a denominational order are fed to said adder.

In a typical conventional serial adder, the digits of the augend and addend values are presented to the adder simultaneously, the sum and carry digits are developed and the carry, after one digit delay, is recirculated to the input of the adder where it may augment the value of the next order digit of one of the values. In the instant case, however, a digit of the addend value is presented to the adder where it is added to the carry from the previous digit addition to form a partial sum. The corresponding order digit of the augend is then presented to the adder where it is added to the partial sum just developed. The corresponding sum digit thereby developed may be stored in memory and the carry digit in a register from where it is withdrawn for addition to the next order digit of the addend value.

It can be seen then that the instant invention provides interlacing of the digits of the addend and augend values as distinct from the simultaneous entry of these digits to the adder.

It is therefore one object of the present invention to provide a serial adder in which the order digits of the addend and augend are fed to an adder in interlaced fashion.

It is a further object to provide such an invention in which the digit orders of the addend are added in said adder to the carry digit of the preceding digit addition to form a partial sum and said partial sum is added in said adder to the corresponding digit of the augend to form the corresponding order digit of the sum plus carry.

These and other objects of the invention will become apparent in connection with a detailed description of the accompanying drawings.

Broadly, the present invention provides a serial adder for adding corresponding digits of addend and augend values to provide the sum and carry of said addition comprising: means to add in said adder an order digit of said addend value and a carry digit from the preceding addition to develop a corresponding order partial sum digit, means to store said partial sum digit, means to add in said adder a corresponding order digit of said augend value and said partial sum digit to provide a corresponding order digit of said sum, one of said additions providing a corresponding carry digit, means to store said sum digit and means to store said carry digit.

In the drawings:

FIGURE 1 is a diagrammatic illustration of means for generating clock pulses to provide timing for the system of the present invention;

FIGURE 2 is a block diagram of the present invention;

FIGURE 5 is a block diagram of means for generating one of the gating signals employed in the present invention;

FIGURE 6 is a block diagram of means for generating one of the gating signals employed in the present invention;

FIGURE 7 is a block diagram of means of generating one of the gating signals employed in the present invention.

Figure 3:
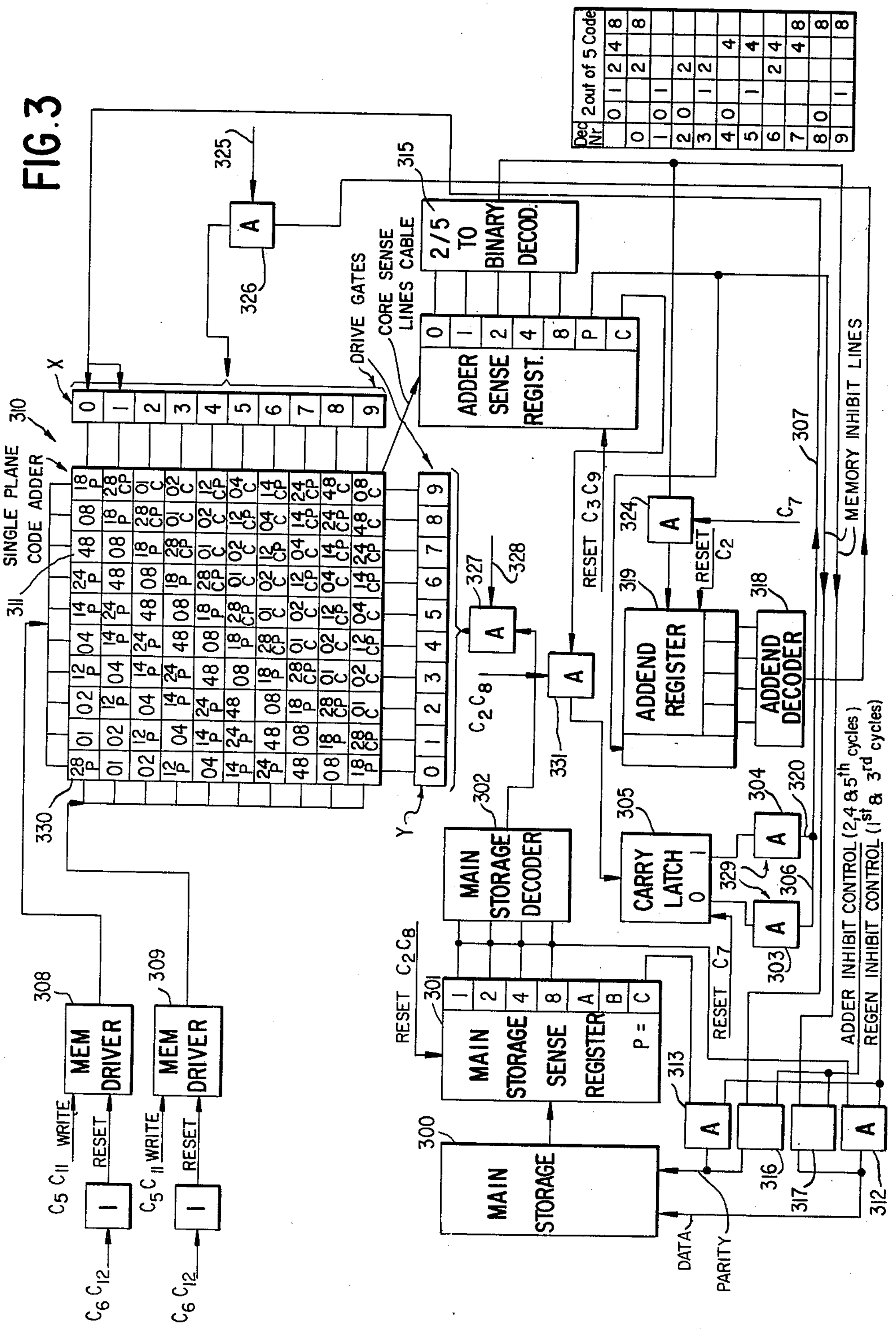
FIGURE 3 is a diagrammatic representation of a more detailed illustration of the system shown in FIGURE 2.

The generation of the clock pulses for timing of the system is accomplished as shown in FIGURE 1. The twelve-stage ring counter 100, fed by pulse generator 101, generates the clock pulses $C_1$ through $C_{12}$. Bearing in mind that each memory cycle is twelve microseconds long and that each of these clock pulses is two microseconds long, there are six of these clock pulses for each of the memory cycles. The $C_6$ pulse feeds a five-stage counter 102. The first and third stages of this five-stage counter are fed to OR gate 103 to provide the Regen. Inhibit Control. Therefore, this control is provided during the first and third memory cycles. The second, fourth and fifth stages of the counter 102 are fed to OR gate 104 to provide during the second, fourth and fifth memory cycles the Adder Inhibit Control.

Referring now to the block diagram shown in FIGURE 2, the main storage stores the digits of the addend and augend. The former will be hereinafter referred to as A and the latter as B. The units digit of A is sent to the one digit adder. It is therein added to the carry from the previous addition which in the instant case would be a zero. The result is the partial sum J. If we consider that A is equal to 17 and B is equal to 25, then in this particular instance J would be equal to 7. The 7 is stored in the register. On the next cycle the units digit of B is fed to the adder. This digit has a value of 5. At the same time, the 7 from the register is fed to the one digit adder and therein added to the 5 to provide a 2 with a carry of 1. The 2 which is the first digit of the sum (S) is stored in the register and the carry of 1 is stored in the carry register. On the next cycle the sum of 2 is stored back into main storage. The tens digit (1) of A is then fed to the one digit adder where it is added to the carry 1 from the carry register to provide a J of 2. This 2 is then stored in the register. On the next cycle the tens digit of B (2) is fed to the one digit adder and the 2 stored in the register is added thereto to provide a sum of 4. The 4 on the next cycle is stored back in main storage. If a carry had resulted from the addition of the tens position, then an extra cycle would be necessary to store the carry back in main storage as part of the sum.

Figure 4:
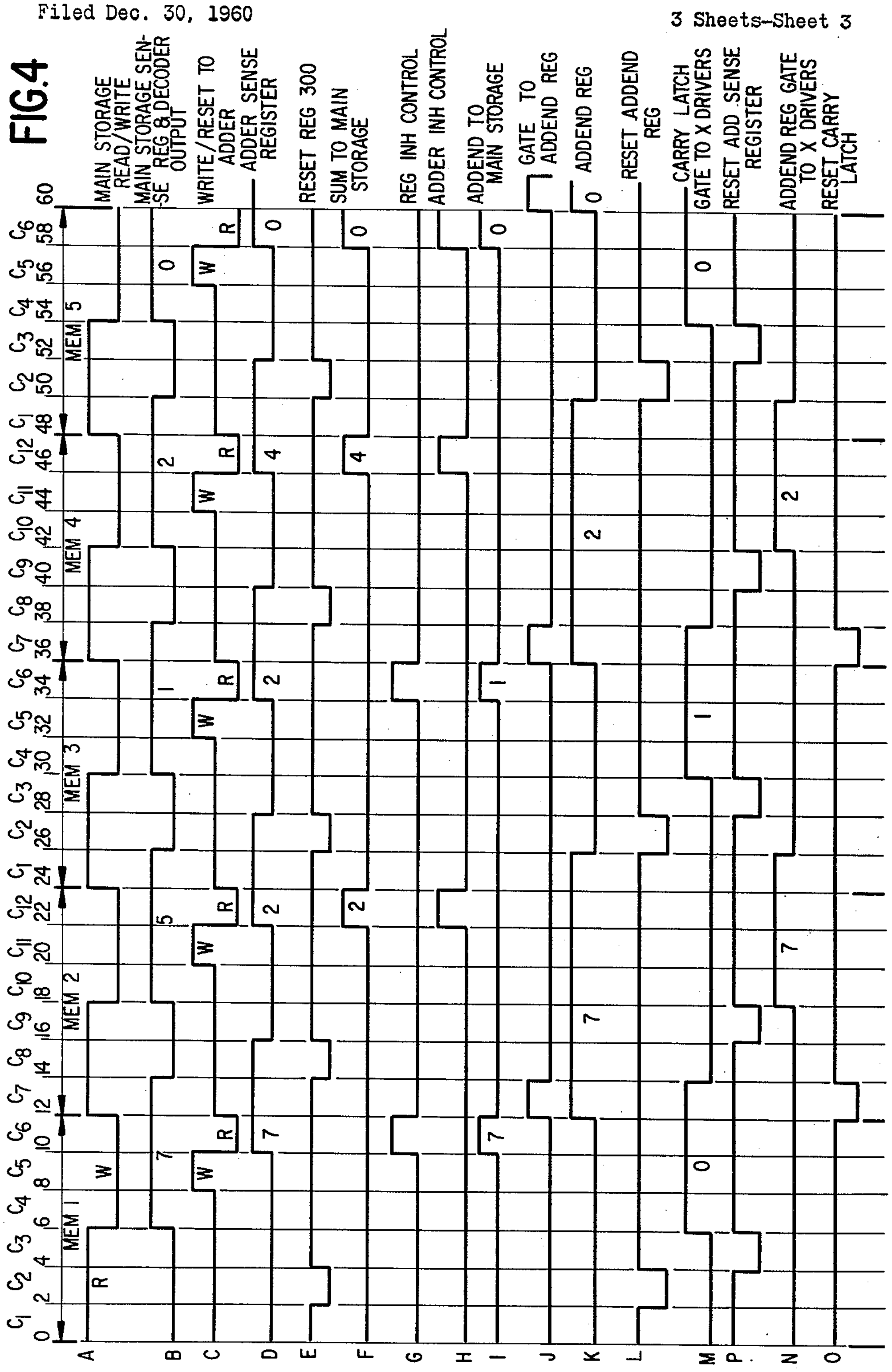
FIGURE 4 is a timing chart indicating various waveforms illustrative of the timing involved in the instant invention.

To implement this block diagram, reference is made to FIGURE 3 and the timing chart as shown in FIGURE 4. Main storage 300 may be, for instance, a three-dimensional core storage having seven planes which are identified as 1, 2, 4, 8, A, B, and C. In this particular case the C plane is the parity plane. Referring to this figure in conjunction with the timing chart, it can be seen that in the first memory cycle the read sub-cycle for main storage occurs between $C_1$ and $C_3$ time. During this sub-cycle the units digit of A is read out of main storage and stored in the main storage sense register 301. We are here assuming in the instant operation that A is to be regenerated back into storage and the location of B in storage is ultimately to be occupied by the sum. Curve A indicates the read-write sub-cycles during each of the memory cycles. As shown in curve E, the $C_2$ and $C_8$ pulses reset the main storage register 301. The adder sense register 314 is reset at $C_3$ and $C_9$ as shown by curve P. As shown in curve L, the $C_2$ pulse resets the addend register 319. During $C_1$ to $C_3$ the units digit 7 of A is read out of memory and stored in the main sense register 301 and decoded from binary-to-decimal by main storage decoder 302. From $C_4$ to $C_6$ this 7 is fed to the Y drive gates and, as shown by curve B, thereby raises the $Y_7$ line. As shown by curve M, the carry gate is applied to AND gates 303 and 304 to raise the zero line 306 due to the fact that carry latch 305 is at this time in the zero state. This line 306 through cable 307 applies a potential to the $X_0$ drive gate to raise the $X_0$ line. Therefore, during memory cycle 1 between $C_4$ and $C_6$ the $Y_7$ line is up and the $X_0$ line is up. At $C_5$ the memory driver 308 and the add driver 309 apply write pulses to the Y and X coordinate lines respectively of the adder 310. This causes core in the single plane core adder 311 to switch to its set state. All of the cores in this adder are identified by the sense line associated therewith. 2-out-of-5 code is employed and an associated legend is shown in the box in connection with this figure. It is assumed here that we are employing odd bit parity check. A parity bit is present whenever the number of bits would otherwise be an even number for straight binary representation of the number.

At $C_6$ the memory driver 308 and the add driver 309 apply reset pulses to the coordinates of the single plane core adder 310. This will reset core 311 to store a 7 in the adder sense register 314. Curve D identifies the content of this adder sense register.

At $C_6$ Regen. Inhibit Control is applied to AND gates 312 and 313. This gates the data and parity bits of the units digit 7 of A back into main storage 300. Curve G identifies the Regen. Inhibit Control and curve I illustrates the regeneration of A back into main storage.

During memory cycle 2 at $C_7$ as shown by curve J, the 7 stored in adder sense register 314 and decoded from 2-out-of-5 to binary by the decoder 315 is gated as shown by curve J into the addend register as shown in curve K. $C_7$ pulse resets carry latch 305 as shown by curve O. $C_8$ pulse resets register 301 and gates the C bit to carry latch 305 through AND gates 331. In the instant problem this bit is a zero so the latch remains in its zero state. Similarly as in memory cycle 1, during this memory cycle 2 the units digit of B is withdrawn from main storage 300 and is stored in the main storage sense register 301. This digit is a 5 and therefore from $C_{10}$ to $C_{12}$ the $Y_5$ line is raised by the output of the decoder 302 to the Y drive gates. Also from $C_{10}$ to $C_{12}$ the contents of the addend register 319, decoded by the addend decoder 318 is gated to the X drive gates to raise the $X_7$ line. This gating is shown by curve N. At $C_{11}$ the drivers 308 and 309 apply write pulses to the X and Y coordinates of the adder 310 to switch core 321. $C_{12}$ causes drivers 308 and 309 to reset core 321 and to store a 2 plus carry 1 in the adder sense register 314. The decoder 315 sends this back to main storage 300 via the gates 316 and 317 which are conditioned by the Adder Inhibit Control at $C_{12}$. This 2 is stored in the location in storage originally occupied by the units digit of B. Curve F indicates the storage of the sum in main storage. The Adder Inhibit Control is shown in curve H. Since the switching of core 321 provides a carry bit, the C output of adder sense register 314 switches carry latch 305 in the 1 state at $C_{12}$ at $C_2$ time of memory cycle 3.

Similarly in memory cycle 3, the $Y_1$ line is raised from $C_4$ to $C_6$ due to the withdrawal of the tens digit 1 of A from main storage 300. The carry latch gates are conditioned as shown in curve M to raise the 1 line 320 via cable 307 to the $X_1$ driver gate, thereby raising the $X_1$ line. At $C_5$ the write pulse to X and Y coordinates switches core 322 in the adder 310. At $C_6$ the reset pulse to X and Y coordinates resets core 322 to store a 2 in the adder sense register 314. At $C_6$ the Regen. Inhibit Control conditions gates 312 and 313 to regenerate the tens digit 1 of A back in main storage.

In memory cycle 4 the decoder output 315 is gated to the addend register 319 to store a 2 therein. At $C_7$ the carry latch is reset. At $C_8$ registers 301 and 314 are reset. During $C_{10}$ to $C_{12}$ the tens digit of B raises the $Y_2$ line in the adder 310. Also during this time the contents of the addend register 319 are gated to raise the $X_2$ line of the adder 310. At $C_{11}$ the write pulse to the X and Y coordinates switches core 323 in the core adder 310. At $C_{12}$ the reset pulse to the X and Y coordinates stores a 4 in the adder sense register 314. The binary 4 at the output of decoder 315 is stored in the tens position of B in main storage via the gates 316 and 317 which are conditioned by the Adder Inhibit Control.

In memory cycle 5 at $C_2$ the addend register 319 and registers 301 and 314 are reset. From $C_4$ to $C_6$ the $Y_0$ line is raised and during this time the carry latch 305 is gated to the X drivers. It applies a potential to the $X_0$ line since the latch is in a zero state. At $C_5$ the write pulse to the X and Y coordinates switches core 330. At $C_6$ the reset pulse to the X and Y coordinates stores a zero in the adder sense register 314. Additionally, the output of the decoder 315 is gated through gates 316 and 317 to store a zero in main storage. The END OP signal generated during this fifth memory cycle by counter 102 indicates the end of the addition.

Referring now to additional circuitry to achieve proper timing, it can be seen that AND gates 324 gates the output of the decoder 315 to the addend register 319 at $C_7$. FIGURE 5 shows a latch 500 which is set at $C_{10}$ time and reset at $C_2$ to provide the gating signal on line 325 for gates 326. This provides the gating for the addend decider 318 to the X drive gates. The gating signal to AND gates 327 to provide the gating from the decoder 302 to the Y drive gates is shown in FIGURE 6. The latch 600 is set by $C_4$ and $C_{10}$ through OR gate 601 and reset by $C_2$ and $C_8$ through OR gate 602. The gating signal is applied on line 328 to gates 327. FIGURE 7 shows the generation of the carry gate for the carry latch 305. The latch 70 is set at $C_4$ and reset at $C_8$. The gating signal is applied on line 329 to AND gates 303 and 304.

While one form of the invention has been illustrated, others obvious to those skilled in the art are contemplated to be within the spirit and scope of the accompanying claims. While the system has been illustrated employing a radix of 2, obviously other radices may be employed.

What is claimed is:

1. An adder for adding two digits comprising a single adder stage, means for storing carry digits, means for applying a first digit signal and a stored carry digit signal to said single adder stage to produce a partial sum signal, means for storing said partial sum signal, and means for applying said partial sum signal and a second digit signal to said single adder stage to produce a signal representative of the sum of said first and second digits.

2. An adder for adding two digits comprising a single adder stage, register means for storing carry digits, means for applying a first digit to said single adder stage, means for applying a previously stored carry digit to said single adder stage, thereby providing a partial sum, means for storing said partial sum, means for applying said partial sum and said second digit to said single adder stage to provide a first order sum and a second carry digit, means to store said second carry digit and means to apply said second carry digit to said single adder stage to provide a second order sum.

3. An adder for adding two digits comprising a single adder stage, register means for storing carry digits, means for applying a first digit and a previously stored carry digit to said single adder stage thereby providing a partial sum and a second carry digit, means for storing said carry digit in said register means, means for applying a second digit and said partial sum to said single adder stage to provide a first order sum, and means to apply said second carry digit to said single adder stage to provide a second order sum.

4. A serial adder for adding two numbers consisting of corresponding orders of digits comprising a single adder stage, a carry register for storing carry digits, means for applying the first order digit of the first number to said single adder stage, means for applying a previously stored carry digit to said single adder stage from said carry register thereby producing a first partial sum and a second carry digit, second register means, means for storing said first partial sum in said second register means, means for storing said second carry digit in said carry register, means for applying said first partial sum and the first order digit of the second number to said single adder stage to produce a first order sum and a third carry digit, a memory means, means to store said first order sum in said memory means, means to store said third carry digit in said carry register, means to apply the second order digit of said first number to said single adder stage, and means to apply selectively said second and third carry digits to said single adder stage to produce a second partial sum.

References Cited in the file of this patent

UNITED STATES PATENTS 2,899,133 Tyron ---------------- Aug. 11, 1959